(12) United States Patent
Pruksch et al.

(10) Patent No.: US 12,459,529 B2
(45) Date of Patent: Nov. 4, 2025

(54) METHOD FOR ASSISTING A USER OF A VEHICLE BY USING AN INDICATOR FOR SIGNALING A CHANGE OF AN OPERATING MODE OF THE VEHICLE WITH RESPECT TO DEGREE OF AUTOMATION AND FOR SIGNALING AN ESCALATION LEVEL FOR THE CHANGE

(71) Applicant: Robert Bosch GmbH, Stuttgart (DE)

(72) Inventors: Achim Pruksch, Neudenau (DE); Hanna Otto, Stuttgart (DE); Javier Riel Rosales, Shanghai (CN); Lenne Ahrens, Heimsheim (DE); Liza Christine Dixon, Heilbronn (DE); Lu Wang, Shanghai (CN); Norbert Schneider, Wuerzburg (DE); Yao Pan, Shanghai (CN)

(73) Assignee: ROBERT BOSCH GMBH, Stuttgart (DE)

( * ) Notice: Subject to any disclaimer, the term of this patent is extended or adjusted under 35 U.S.C. 154(b) by 232 days.

(21) Appl. No.: 18/062,682

(22) Filed: Dec. 7, 2022

(65) Prior Publication Data
US 2023/0219593 A1    Jul. 13, 2023

(30) Foreign Application Priority Data

Jan. 10, 2022   (DE) ..................... 10 2022 200 153.2

(51) Int. Cl.
*B60W 50/16*   (2020.01)
*B60W 50/14*   (2020.01)
*B60W 60/00*   (2020.01)

(52) U.S. Cl.
CPC ............ *B60W 50/16* (2013.01); *B60W 50/14* (2013.01); *B60W 60/005* (2020.02); *B60W 60/0055* (2020.02); *B60W 2050/143* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 9,428,183 | B2 * | 8/2016 | Foley | G05B 9/02 |
| 9,937,795 | B2 * | 4/2018 | Konet | B60K 35/80 |
| 10,272,783 | B2 * | 4/2019 | McNew | B60K 35/00 |
| 11,148,683 | B2 * | 10/2021 | Kaji | B62D 6/00 |

* cited by examiner

Primary Examiner — Todd Melton
(74) Attorney, Agent, or Firm — NORTON ROSE FULBRIGHT US LLP

(57) ABSTRACT

A method for assisting a user in an interaction with an apparatus including at least one automated and/or partially automated and/or manual operating state by way of a control device. A possible change or a compulsory change of operating state of the apparatus is ascertained, an escalation level for the change of operating state of the apparatus is ascertained, the ascertained change of operating state and the escalation level are signaled to the user by a dynamic indicator. A control device, a computer program, a machine-readable storage medium, and an indicator are also described.

8 Claims, 5 Drawing Sheets

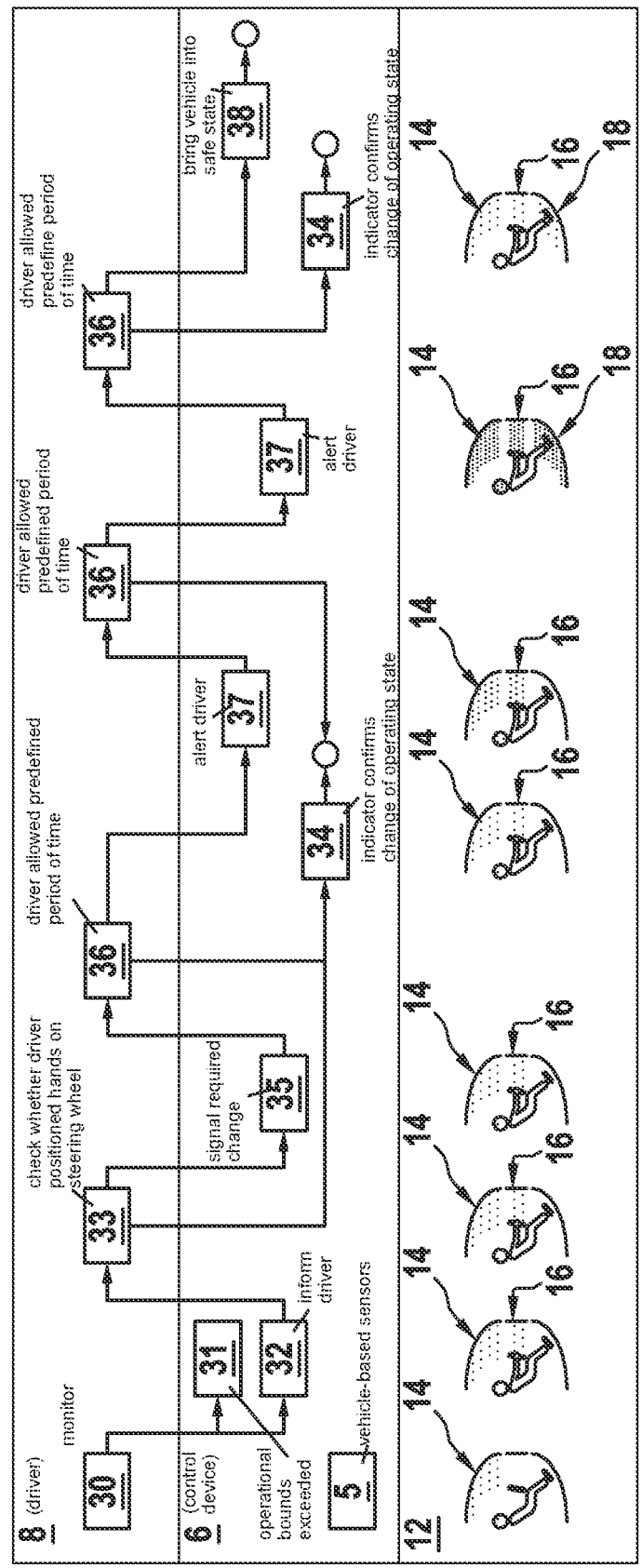

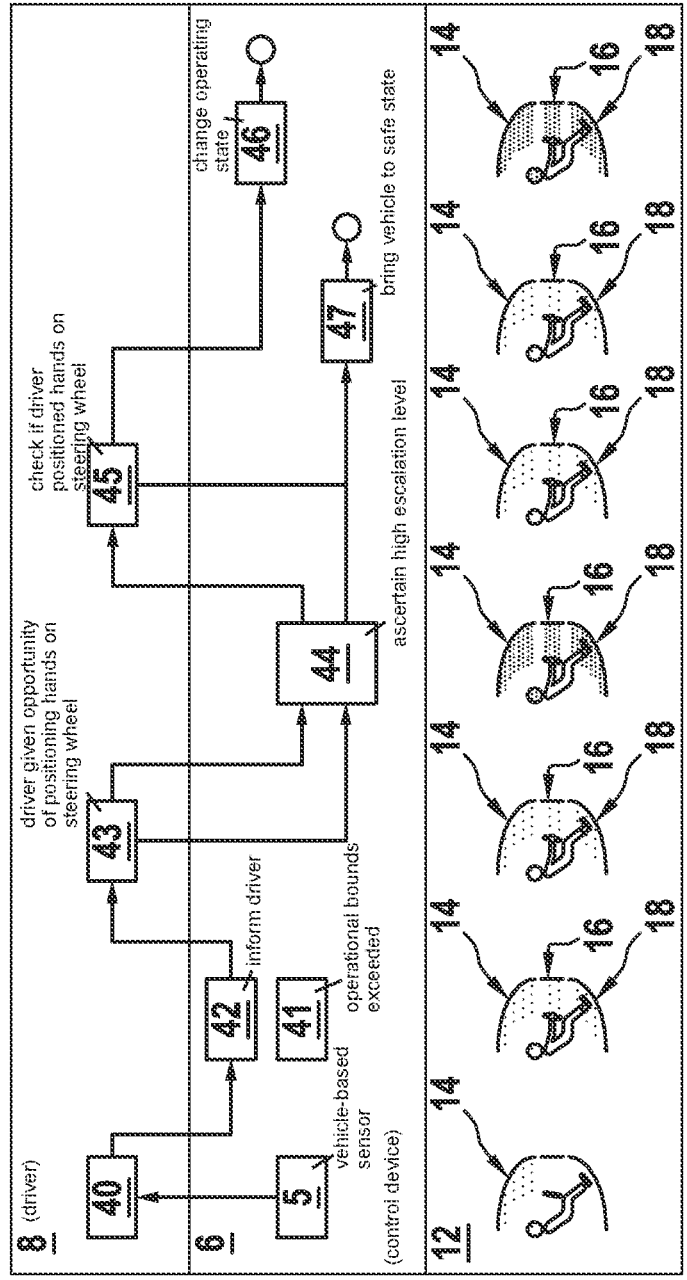

METHOD FOR ASSISTING A USER OF A VEHICLE BY USING AN INDICATOR FOR SIGNALING A CHANGE OF AN OPERATING MODE OF THE VEHICLE WITH RESPECT TO DEGREE OF AUTOMATION AND FOR SIGNALING AN ESCALATION LEVEL FOR THE CHANGE

CROSS REFERENCE

The present application claims the benefit under 35 U.S.C. § 119 of German Patent Application No. DE 10 2022 200 153.2 filed on Jan. 10, 2022, which is expressly incorporated herein by reference in its entirety.

FIELD

The present invention relates to: a method for assisting a user in an interaction with an apparatus; an indicator; a control device; a computer program; and a machine-readable storage medium.

BACKGROUND INFORMATION

The numerous possible operating states or types of operation, and the resulting confusion of drivers, together with driver trust in the automation of the vehicle, represent a significant safety issue. While a driver may be aware of the current operating state, his responsibility with regard to interacting with the driving automation may nevertheless be unclear and problematic. The driver first has to interpret the meaning of the status icons that indicate the operating state, and then convert the meaning of these status icons into an appropriate physical interaction with the system. This increases the driver's cognitive load, and leaves room for errors, which may lead to misuse of the system and impair safety. Moreover, vehicle manufacturers generally use their own icons, which deviate from the ISO standard, for signaling operating states. In U.S. Pat. No. 10,272,783 B2, for example, a matrix is described, including pictograms arranged in a plurality of columns and rows, to signal the driver's responsibility with regard to the operating states of a vehicle.

SUMMARY

A, object of the present invention includes providing a method for assisting an operator of automated apparatuses, which is intuitive and minimizes the cognitive load on an operator.

This object may be achieved by the present invention. Advantageous embodiments of the present invention are disclosed herein.

According to one aspect of the present invention, a method for assisting a user in an interaction with an apparatus, in particular an apparatus that is operable in an automated and/or partially automated and/or manual fashion, is provided.

According to an example embodiment of the present invention, the apparatus includes at least one corresponding automated and/or partially automated and/or manual operating state. In particular, the apparatus may be a vehicle, a processing plant, a manufacturing plant, and the like.

The method may preferably be executed by a control device, which is integrated into the apparatus or is connectable to the apparatus by way of a wired or wireless communication connection.

According to an example embodiment of the present invention, in one step, a possible or optional change, or a compulsory or required change, of the operating state of the apparatus is ascertained. Furthermore, an escalation level for the change of operating state of the apparatus is ascertained.

The ascertained change of operating state and the escalation level are then signaled to the user by a dynamic indicator.

According to a further aspect of the present invention, an indicator is provided for signaling a required and/or an optional change of an operating state. The indicator preferably includes a head-related responsibility display, a hand-related responsibility display, and a foot-related responsibility display. The at least one responsibility display is designed to signal the required change or the optional change of operating state to the user in such a way that they are distinguishable from each other.

Because the indicator is divided into a head-related responsibility display, a hand-related responsibility display, and a foot-related responsibility display, the user is able to establish intuitively whether he should observe the apparatus or supervise the operating state, control the apparatus manually or with his hands, or whether the user should control with the aid of his feet, e.g., by operating pedals or foot-operated switches. If one of the responsibility displays is activated, the user knows immediately what form of action he should take. Correspondingly, an easing of the burden on the user due to automations may be signaled if one or more responsibility displays are deactivated or extinguished, e.g., because an automated driving assistance system is available.

The method and the indicator may be used to signal to the user, who may be embodied as a driver of a vehicle, his role and responsibility in operating the apparatus. The intuitive design of the indicator may serve to minimize the cognitive load on the user, thus improving operating safety.

Although the method will be described substantially with reference to automated driving functions and in respect of automated and/or partially automated vehicles, the method is not, however, limited to vehicles. Rather, the method may be used for interfaces between human users and automated applications or apparatuses in general in order to achieve greater safety or higher performance through correct operation of the apparatus by the user.

According to a further aspect of the present invention, a control device is provided, the control device being designed to execute the method. The control device may be, for example, an apparatus-based control device, a control device external to the apparatus, or a server unit external to the apparatus, such as, e.g., a cloud system. The control device may preferably access units in order to communicate with the user by way of the indicator.

Furthermore, according to one aspect of the present invention, a computer program is provided, including commands which, when the computer program is executed by a computer or control device, cause the computer or control device to execute the method according to the present invention. According to a further aspect of the present invention, a machine-readable storage medium is provided, on which the computer program according to the present invention is stored.

The control device may be arranged in an apparatus embodied as a stationary or mobile unit, which may be operable in an assisted, partially automated, highly automated, and/or fully automated or driverless fashion in accordance with the BASt [Bundesanstalt für Straßenwesen—German Federal Highway Research Institute] standard. For example, the stationary or mobile unit may be embodied as a vehicle, a robot, a drone, a watercraft, a rail vehicle, a robotaxi, an industrial robot, a manufacturing plant, a treatment or processing plant, a commercial vehicle, a bus, an airplane, a helicopter, and the like.

The escalation level is ascertained by the control device according to the situation. For example, if there is no reason for a change of operating state, a low escalation level may be ascertained. If a reason exists, e.g., a lack of availability of map data or probable sensor impairments, the escalation level may be raised as a function of a distance from the corresponding reason or from the point from which the change of operating state is necessary. A maximum escalation level may be ascertained when a required or automatically performed change of operating state is imminent.

As an alternative or in addition, bringing the apparatus into a safe state may likewise be classed as a change of operating state.

In a further exemplary embodiment of the present invention, the ascertained change of operating state, and the escalation level, may be signaled to the user haptically, visually, and/or acoustically by the dynamic indicator by way of at least one unit within and/or on the apparatus. As a result, a plurality of possible senses of the user may be addressed by the indicator to allow effective signaling.

Even in noisy environments, for example, the indicator may alert the user to possible changes of operating states using haptic and/or acoustic signals. As an alternative or in addition, acoustic indications of the possible change of operating state may also take place.

Preferably, the type of indication by the indicator may illustrate the urgency or escalation level. In particular, color, frequency, or intensity, and the like may serve to signal a higher escalation level.

According to a further specific embodiment of the present invention, to signal the ascertained change of operating state, the dynamic indicator is animated by way of a unit embodied as a lighting system, a screen, a hologram, a portable device, and/or a head-up display. In particular, the indicator may be implemented as a two-dimensional or three-dimensional animation. Furthermore, units such as windshield wipers, steering wheel actuators, pedals, and the like may also be utilized to generate haptic or visual feedback or signals. In this case, the indicator may be employed in conjunction with conventional UNECE (United Nations Economic Commission for Europe) symbols. In addition, in line with the requirements in UNECE R79 and the corresponding extensions relating to partially automated systems, further standards, such as, e.g., ISO standards for ACC and LKAS systems, may be taken into consideration in the implementation of the indicator.

According to a further exemplary embodiment of the present invention, the apparatus is embodied as a vehicle that is operable in an automated and/or partially automated fashion, in which case the ascertained change of operating state, and the escalation level, are signaled by the dynamic indicator to a user embodied as a driver.

In this case, the indicator is designed to indicate the change of at least one operating state of the vehicle that is operable in an automated and/or partially automated fashion.

As a result of this, the driver of a vehicle that is operable in an automated and/or partially automated fashion may be informed intuitively by the indicator, which is output, e.g., in an infotainment system, about the possible or required changes of operating states. An output of this type may alternatively or additionally take place in a head-up display, and/or in an instrument cluster.

When approaching road works, for example, a fully automated operating mode of the vehicle may be deactivated with high urgency, and so the driver may be alerted by the indicator that he should at least take over the steering. The corresponding responsibility of the driver may be signaled by extinguishing the hand-related responsibility display of the indicator.

According to a further specific embodiment of the present invention, an escalation level for the change of operating state is signalable by the at least one responsibility display in the form of a color and/or animation. A coloring of the indicator, such as, e.g., red or yellow or blue, which may be intensified by a corresponding coloring of the lighting in the vehicle interior, may illustrate the escalation level or urgency. As an alternative or in addition, a background color and/or frame color of displays or screens may also be adapted to the coloring of the indicator. An illustration of the escalation level of this type is particularly intuitively perceptible to the user.

According to a further specific embodiment of the present invention, all responsibility displays are activated in the case of a manual operating state, with the foot-related responsibility display being deactivated in the case of a partially automated longitudinal guidance of the vehicle, a hand-related responsibility display being deactivated in the case of a partially automated transverse guidance of the vehicle, the head-related responsibility display being deactivated in the case of an automated transverse guidance and longitudinal guidance of the vehicle. This applies in particular to vehicles with SAE Level 3 or above, or in highly automated vehicles in accordance with the BASt standard. Using an indicator of this type having a modular construction, the user may be alerted to impending changes of operating states, and to the resulting areas of responsibility or roles for the user, with minimal cognitive load.

With the aid of greatly simplified schematic diagrams, preferred exemplary embodiments of the present invention will be explained in more detail below.

BRIEF DESCRIPTION OF THE DRAWINGS

FIG. 4 shows a schematic flow diagram to illustrate a method according to a second specific embodiment of the present invention.

FIG. 5 shows a schematic flow diagram to illustrate a method according to a third specific embodiment of the present invention.

DETAILED DESCRIPTION OF EXAMPLE EMBODIMENTS

Figure 1:
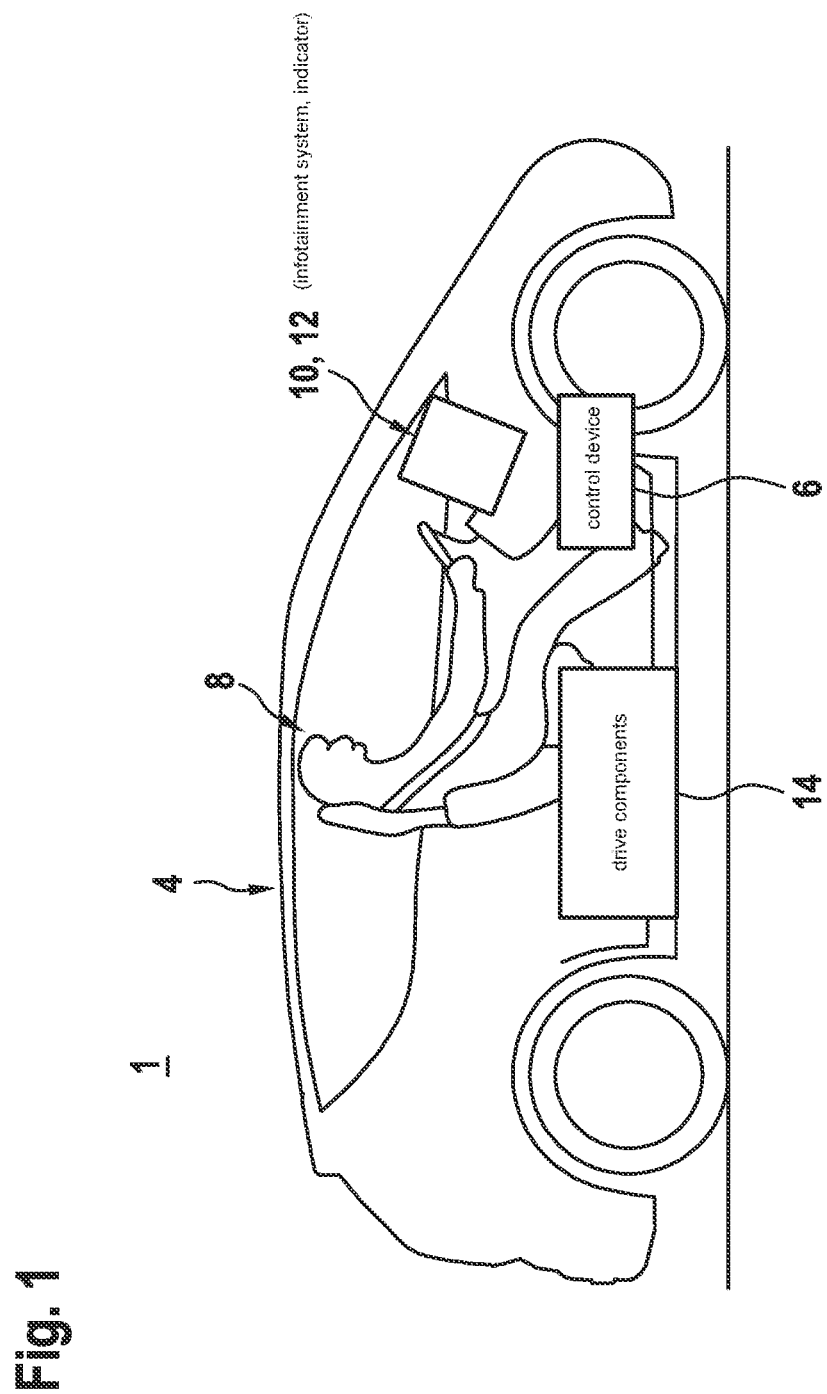
FIG. 1 shows a schematic side view of a vehicle arrangement to illustrate a method according to a specific embodiment of the present invention.

FIG. 1 is a schematic side view of a vehicle arrangement 1 to illustrate a method 2 according to a specific embodiment. The method is described in detail in FIGS. 3, 4, and 5.

Vehicle arrangement 1 includes an apparatus 4, which is embodied as a vehicle 4 or an exemplary passenger car.

Vehicle 4 is operable in an assisted, partially automated, highly automated, and/or fully automated or driverless fashion in accordance with the BASt standard. A control device 6 is therefore able to take over the longitudinal guidance and/or the transverse guidance of vehicle 4 in an automated or partially automated fashion. A user 8 of apparatus 4, who is embodied as a driver of vehicle 4 here, is able to interact with control device 6 and vehicle 4 by way of an infotainment system 10. For the sake of simplicity, only a screen of infotainment system 10 is shown. As an alternative or in addition to infotainment system 10, visualization may take place by way of an instrument cluster display and/or a head-up display (not shown).

Infotainment system 10 here represents a possible embodiment of a unit that is able to signal an ascertained change of operating state of vehicle 4, and an ascertained escalation level, to user 8 haptically, visually, and/or acoustically using a dynamic indicator 12.

Vehicle 4 may additionally comprise further units, which are embodied as, e.g., lighting elements, speakers, actuators on the pedals or on the steering wheel, windshield wipers, and the like. These elements may be controlled by control device 6 to interact with user 8.

Furthermore, the at least one unit 10 may be a portable device of user 8, such as e.g. a tablet, smartphone, smartwatch, 3D glasses, or a VR device, and the like.

Control device 6 may, furthermore, interact with drive components 14 of vehicle 4, or have a data connection thereto, and may also access sensors of vehicle 4 (not shown). This allows control device 6 to ascertain the need for, or an option of, a change of operating state of vehicle 4, and to establish the corresponding urgency or escalation level. For example, on a freeway, the availability of automated steering, during which driver 8 only has to monitor the traffic situation, may be signaled to driver 8 by unit 10. From a manual control, driver 8 may, if desired, access partially automated control of vehicle 4.

The corresponding signaling takes place by way of an indicator 12, which transmits the optional changes as a suggestion and the required changes of operating state as an instruction to user 8 dynamically, and optionally in animated form.

Figure 2:
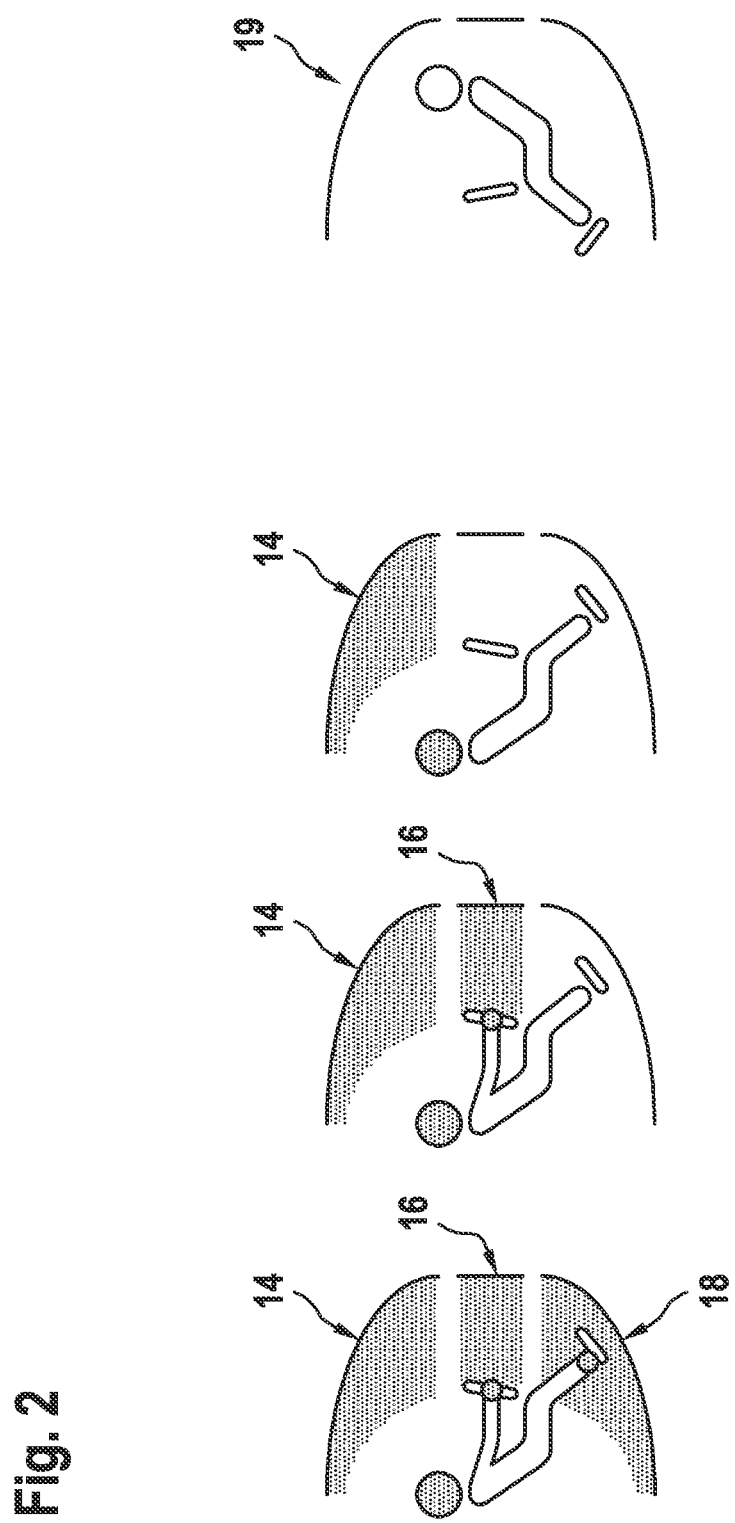
FIG. 2 shows a schematic diagram of an indicator of modular construction according to a specific embodiment of the present invention.

FIG. 2 is a schematic diagram of an indicator 12 of modular construction according to one specific embodiment. Indicator 12 may be output graphically, acoustically, and/or haptically, e.g., by infotainment system 10. Infotainment system 10 is used merely by way of example. It is also possible for speakers, actuators in the vehicle interior, instrument cluster displays, head-up displays, vehicle interior lighting, illuminated interior accents, and the like to be used for the output of indicator 12.

In the exemplary embodiment shown, the output of indicator 12 takes place graphically on a screen of infotainment system 10, and indicates a current operating state. Furthermore, a change of operating state of vehicle 4 may be signaled to driver 8 by indicator 12 in order to illustrate to driver 8 his responsibility and tasks during the operating state.

Indicator 12 thus serves to signal a required and/or an optional change of an operating state of vehicle 4, and is illustrated on the screen of infotainment system 10 as from a point of view of driver 8. In the exemplary embodiment shown, indicator 12 includes a head-related responsibility display 14, a hand-related responsibility display 16, and a foot-related responsibility display 18. Responsibility displays 14, 16, 18 are designed to signal the required change or the optional change of operating state to driver 8 in such a way that they are distinguishable from each other.

In contrast to conventional status icons in vehicle 4, which merely inform driver 8 about the driving mode or current operating state, indicator 12, in the form of responsibility displays 14, 16, 18, informs driver 8 directly how to interact appropriately with the automated driving system of vehicle 4. Responsibility displays 14, 16, 18 communicate the role of driver 8 dynamically, and assist with the perception of the operating state of vehicle 4, thus guiding driver 8 toward optimal behavior, and increasing traffic safety.

Responsibility displays 14, 16, 18 substantially serve as an example of a possible embodiment of indicator 12. The activated responsibility displays are shown by shading.

If all responsibility displays 14, 16, 18 are activated, a manual operating state is active, or it is necessary to change to a manual operating state of vehicle 4 so that driver 8 takes over control and traffic monitoring completely and without assistance.

If head-related responsibility display 14 and hand-related responsibility display 16 are activated, and foot-related responsibility display 18 is correspondingly deactivated, acceleration and/or braking may be taken over by vehicle 4, e.g., in the context of an adaptive cruise control.

If only head-related responsibility display 14 is activated, besides automated braking and accelerating, automated steering also takes place by way of control device 6 or a corresponding control system of vehicle 4. In this case, driver 8 should merely observe the traffic in order to be able to intervene rapidly if necessary. This is signaled intuitively to driver 8 by way of activated head-related responsibility display 14.

If all responsibility displays 14, 16, 18 are deactivated, a change to a driverless or fully automated operating state may take place. To illustrate this operating state, a schematic driver figure may be shown facing away from the direction of travel in indicator 12 in a fully automated operating state 19 of this type.

The shadings that illustrate the respective responsibility displays 14, 16, 18 in activated form may be shown in different colors, and/or flashing with varying flash frequencies, to signal an urgency or an escalation level for the change of operating state, or a change of behavior of driver 8. For example, in an emergency situation, the shading may appear in red. In the case of an optional change of operating state, which may be understood merely as a suggestion, a green, white, gray, or blue coloring of the shading is possible.

The respective responsibility displays 14, 16, 18 may preferably switch on or activate, or switch off or deactivate, dynamically in order to illustrate corresponding changes of operating states of vehicle 4 to driver 8 with appropriate urgency.

Responsibility displays 14, 16, 18 may be controlled by control device 6 according to the degree of active driving automation or the operating state, and according to the role of driver 8 in the operating state, this being based on the configuration of the system.

An appropriate two-dimensional or three-dimensional animation of driver 8 may also be integrated into a head-up or holographic display.

Figure 3:
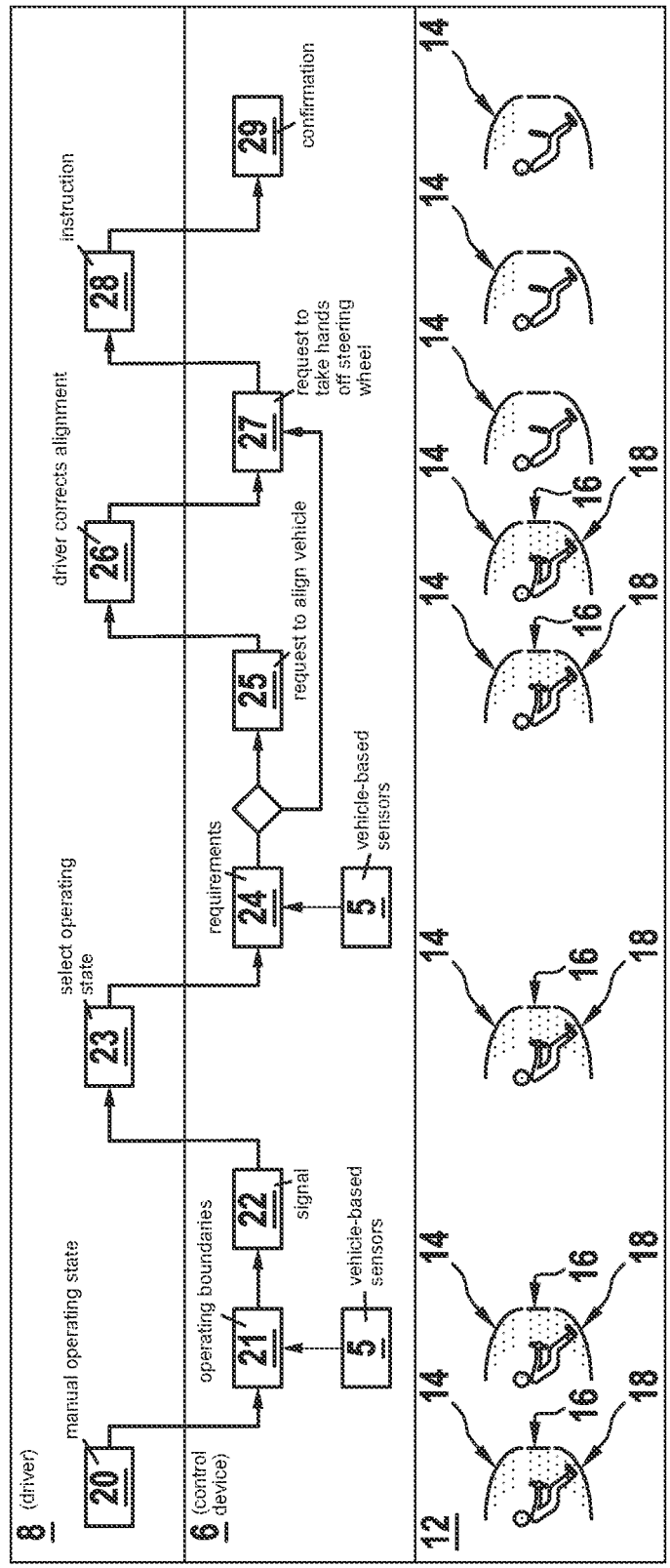
FIG. 3 shows a schematic flow diagram to illustrate a method according to a first specific embodiment of the present invention.

In FIGS. 3 through 5, a method 2 for assisting a user 8 in an interaction with an apparatus 4 including at least one automated and/or partially automated and/or manual operating state is illustrated. Here, the different responsibility displays 14, 16, 18 of indicator 12 shown in FIG. 2 are used by way of example to illustrate method 2. User 8 here is likewise embodied as a driver 8 and apparatus 4 as a vehicle 4.

FIG. 3 is a schematic flow diagram to illustrate a method 2 according to a first specific embodiment. In this exemplary embodiment, a change between a manual operating state and a partially automated operating state, in which vehicle 4 takes over the steering, is illustrated.

During a manual operating state 20, driver 8 has sole control of vehicle 4. All responsibility displays 14, 16, 18 of indicator 12 are activated. This is signaled to driver 8 in infotainment system 10.

Control device 6 is able to communicate with vehicle-based subsystems and thus ascertain a need for a change of operating state of vehicle 4. This may be implemented, e.g., by successfully ascertaining operational boundaries 21. Operational boundaries 21 may be ascertained in the context of ascertaining a possible or compulsory change of operating state. For this purpose, measurement data from sensors of vehicle 4 are received and analyzed. If the requirements for a partially automated operating state are met, the change to this operating state may be signaled with a signal 22 to driver 8. By way of example, the availability of the partially automated operating state 23 is signaled here by way of a visual pop-up display, which driver 8 selects by touching a touch-sensitive screen.

Once the available operating state 23 has been selected, the requirements 24 for the operational boundaries of the partially automated operating state are checked by consulting measurement data of vehicle-based sensors 5.

If the requirements 24 are not met, e.g., because a vehicle 4 is not optimally centered within the driving lane, driver 8 is presented with a request 25 to align vehicle 4. If driver 8 corrects 26 the alignment of vehicle 4, or if the requirements 24 of the partially automated operating state are met, driver 8 is presented with a request 27 to take his hands off the steering wheel of vehicle 4. This is done by way of indicator 12, which indicates the desired action to driver 8, e.g., by deactivating hand-related responsibility display 16 and foot-related responsibility display 18.

If driver 8 follows instruction 28 and takes his hands off the steering wheel, a confirmation 29 may then be transmitted to driver 8 by way of infotainment system 10.

FIG. 4 is a schematic flow diagram to illustrate a method 2 according to a second specific embodiment. Here, an exemplary change of the partially automated operating state from FIG. 3 to manual vehicle control is shown.

In the exemplary embodiment shown, it is assumed that vehicle 4 is in the partially automated operating state, and driver 8 is monitoring 30 the traffic situation. While the operating state is activated, measurement data from vehicle-based sensors 5, such as, e.g., camera sensors, radar sensors, LIDAR sensors, GNSS sensors, drive monitoring systems, and the like, are received and processed by control device 6.

In a further step, it is established by control device 6 that the operational boundaries on the stretch of road are exceeded 31, and the partially automated operating state will no longer be available. Driver 8 is informed 32 of this impending change of operating state by infotainment system 10. In a further step 33, it is checked whether driver 8 has positioned his hands on the steering wheel.

The exceeding of operational boundaries takes place in the context of ascertaining the change of operating state.

The ascertaining of the change of operating state preferably takes place continuously or at regular time intervals, the time intervals being adjustable according to the situation. For example, the time intervals may be shortened in the event of a high volume of traffic.

Furthermore, the impending change of operating state is signaled to driver 8 by indicator 12. In addition to head-related responsibility display 14, hand-related responsibility display 16 is activated here. Since the change is not critical at this point in time, control device 6 ascertains a low escalation level, which is illustrated, e.g., by a blue coloring of activated responsibility displays 14, 16.

If driver 8 has positioned his hands on the steering wheel, the change of operating state occurs, and indicator 12 may confirm 34 the change of operating state by way of an animation. If driver 8 fails to perform this action, a reminder or signaling to driver 8 occurs regarding the required change 35. Indicator 12 may likewise be animated for this purpose. Driver 8 may be allowed 36 a predefined period of, e.g., 10 seconds to perform the action.

If driver 8 continues to ignore indicator 12, a change in the escalation level takes place, and responsibility display 14, 16 of indicator 12 is colored yellow. In addition, brakes, horn, lighting elements, and the like may be triggered in order to alert 37 driver 8 to the change.

In a further step 36, driver 8 is again given the opportunity to position his hands on the steering wheel. If driver 8 continues to ignore this opportunity, the classification moves to the highest escalation level, and responsibility displays 14, 16 are colored red in order to illustrate to driver 8 the urgency of the change of operating state. In addition, further units within vehicle 4 may be employed in order to illustrate to driver 8 the urgency of his action. For example, short braking operations may be performed, windshield wipers may be activated, light signals in the vehicle interior may be switched on, or animations may be played by infotainment system 10.

If driver 8 fails to place his hands on the steering wheel at a final request, control device 6 brings 38 vehicle 4 into the safe state.

FIG. 5 is a schematic flow diagram illustrating method 2 according to a third specific embodiment. In FIG. 5, an exemplary alternative to the procedure of FIG. 4 is shown, in which a change of operating state from the partially automated operating state of FIG. 3 back to a manual operating state of vehicle 4 is performed. Here, indicator 12 acts as a warning cascade, within which a rapid escalation up to emergency braking is able to take place.

It is assumed that vehicle 4 is in the partially automated operating state, and that driver 8 is monitoring 40 the traffic situation. While the operating state is activated, measurement data from vehicle-based sensors 5, such as e.g. camera sensors, radar sensors, LIDAR sensors, GNSS sensors, drive monitoring systems, and the like are received and processed by control device 6.

In a further step, control device 6 establishes that the operational boundaries on the stretch of road are exceeded 41, and that the partially automated operating state will shortly no longer be available. Driver 8 is informed 42 of this impending change of operating state by infotainment system 10. In a further step 43, driver 8 is given the opportunity of positioning his hands on the steering wheel within a period of, e.g., 3 seconds. It is also checked here, e.g., by sensors on the steering wheel, or by optical sensors in the vehicle interior, whether driver 8 has positioned his hands on the steering wheel.

All responsibility displays 14, 16, 18 of indicator 12 are activated to illustrate the change of operating state of vehicle 4. Because of the driving situation, the change of operating state is urgent or, in the exemplary embodiment shown, has to take place rapidly, and therefore at the end of the time period a high escalation level is ascertained 44 by control device 6.

Indicator 12 is employed as a wall display. Responsibility displays 14, 16, 18 of indicator 12 in this case are colored red and may be animated such that they flash.

In a subsequent request or check 45, control device 6 may ascertain that driver 8 has positioned his hands on the steering wheel of vehicle 4. As a result, the operating state 46 changes from the partially automated operating state to the manual operating state of vehicle 4. If driver 8 did not comply with request 45, vehicle 4 would be brought 47 into a safe state by control device 6, or emergency braking would be initiated. The transition to the safe state may comprise, e.g., an automated stop on the shoulder, or an automated approach to the nearest parking lot or rest area.

What is claimed is:

1. A method for assisting a user in an interaction with a vehicle including at least one automated and/or partially automated and/or manual operating mode, by way of a control device that includes a processor system including at least one processor, the method comprising the following steps:
    ascertaining, by the processor system, a possible or compulsory change of operating mode of the vehicle;
    ascertaining, by the processor system, an escalation level for the change of operating mode of the vehicle; and
    signaling, by the processor system, the ascertained change of operating mode and the escalation level, to the user using a dynamic indicator;
    wherein:
        the signaling is performed using a dynamic indicator displaying a representation of a body including a head portion, a hand portion, and a foot portion;
        when transitioning from an indication of a fully automated mode of the vehicle to an indication of a fully manual mode of the vehicle, the indicator transitions from an indicator state in which none of the head, hand, and foot portions are illuminated or highlighted corresponding to the fully automated mode of the vehicle to an indicator state in which only the head portion is illuminated or highlighted corresponding to a first partly-automated mode of the vehicle requiring road monitoring to an indicator state in which the head and hand portions are illuminated or highlighted corresponding to a second partly-automated mode of the vehicle requiring steering but with at least one of automated braking and automated acceleration to an indicator state in which the head, hand, and foot portions are all illuminated corresponding to the manual mode of the vehicle; and
        at least one of an intensity and color of the illumination or highlight of each portion is selected according to the escalation level associated with the corresponding automation or manual mode.

2. The method as recited in claim 1, wherein the ascertained change of operating state and the escalation level are additionally signaled to the user haptically and/or acoustically by way of at least one unit within and/or on the vehicle.

3. The method as recited in claim 1, wherein, to signal the ascertained change of operating state, the dynamic indicator is animated by way of a unit embodied as a lighting system and/or a screen and/or a hologram and/or a portable device and/or a head-up display.

4. The method of claim 1, wherein the dynamic indicator's representation of the body and the illumination or highlighting thereof are such that, as the indicator transitions from the indication of the fully automated mode to the indication of the manual mode, a continuous shaded area representing the illuminated or highlighted portions gradually increases in length, with each gradual increase being provided by the illumination or highlighting of a respective additional one of the head, hand, and foot portions of the body representation.

5. A control device configured to assist a user in an interaction with a vehicle including at least one automated and/or partially automated and/or manual operating mode, the control device comprising:
    a processor system that includes at least one processor, wherein:
        the processor system is programmed to:
            ascertain a possible or compulsory change of operating mode of the vehicle;
            ascertain an escalation level for the change of operating mode of the vehicle; and
            signal the ascertained change of operating mode and the escalation level, to the user using a dynamic indicator;
        the signaling is performed using a dynamic indicator displaying a representation of a body including a head portion, a hand portion, and a foot portion;
        when transitioning from an indication of a fully automated mode of the vehicle to an indication of a fully manual mode of the vehicle, the indicator transitions from an indicator state in which none of the head, hand, and foot portions are illuminated or highlighted corresponding to the fully automated mode of the vehicle to an indicator state in which only the head portion is illuminated or highlighted corresponding to a first partly-automated mode of the vehicle requiring road monitoring to an indicator state in which the head and hand portions are illuminated or highlighted corresponding to a second partly-automated mode of the vehicle requiring steering but with at least one of automated braking and automated acceleration to an indicator state in which the head, hand, and foot portions are all illuminated corresponding to the manual mode of the vehicle; and
        at least one of an intensity and color of the illumination or highlight of each portion is selected according to the escalation level associated with the corresponding automation or manual mode.

6. A non-transitory machine-readable storage medium on which is stored a computer program for assisting a user in an interaction with a vehicle including at least one automated and/or partially automated and/or manual operating mode, by way of a control device that includes a processor system including at least one processor, the computer program being executable by the processor system and, when executed by the processor system, causing the processor system to perform the following steps:
    ascertaining a possible or compulsory change of operating mode of the vehicle;
    ascertaining an escalation level for the change of operating mode of the vehicle; and
    signaling the ascertained change of operating mode and the escalation level, to the user using a dynamic indicator;
    wherein:
        the signaling is performed using a dynamic indicator displaying a representation of a body including a head portion, a hand portion, and a foot portion;

when transitioning from an indication of a fully automated mode of the vehicle to an indication of a fully manual mode of the vehicle, the indicator transitions from an indicator state in which none of the head, hand, and foot portions are illuminated or highlighted corresponding to the fully automated mode of the vehicle to an indicator state in which only the head portion is illuminated or highlighted corresponding to a first partly-automated mode of the vehicle requiring road monitoring to an indicator state in which the head and hand portions are illuminated or highlighted corresponding to a second partly-automated mode of the vehicle requiring steering but with at least one of automated braking and automated acceleration to an indicator state in which the head, hand, and foot portions are all illuminated corresponding to the manual mode of the vehicle; and at least one of an intensity and color of the illumination or highlight of each portion is selected according to the escalation level associated with the corresponding automation or manual mode.

7. An indicator for assisting a user in an interaction with a vehicle including at least one automated and/or partially automated and/or manual operating mode, the indicator being configured to signal an ascertained required and/or an optional change of the operating mode of the vehicle and an escalation level for the change of the operating mode of the vehicle, the indicator comprising:

a dynamic indicator displaying a representation of a body, the representation including a head portion, a hand portion, and a foot portion, wherein the dynamic indicator is configured to:

when transitioning from an indication of a fully automated mode of the vehicle to an indication of a fully manual mode of the vehicle, transition from an indicator state in which none of the head, hand, and foot portions are illuminated or highlighted corresponding to the fully automated mode of the vehicle to an indicator state in which only the head portion is illuminated or highlighted corresponding to a first partly-automated mode of the vehicle requiring road monitoring to an indicator state in which the head and hand portions are illuminated or highlighted corresponding to a second partly-automated mode of the vehicle requiring steering but with at least one of automated braking and automated acceleration to an indicator state in which the head, hand, and foot portions are all illuminated corresponding to the manual mode of the vehicle; and provide the illumination or highlight of each portion with at least one of an intensity and color selected according to the escalation level associated with the corresponding automation or manual mode.

8. The indicator as recited in claim 7, wherein:

in the fully automated mode and the first partly-automated mode, the vehicle provides automated longitudinal and transverse guidance;

in the second partly-automated mode, the vehicle provides longitudinal guidance and a driver provides transverse guidance; and in the manual mode, the driver provides both longitudinal and transverse guidance.

* * * * *